US006424629B1

United States Patent
Rubino et al.

(10) Patent No.: US 6,424,629 B1
(45) Date of Patent: Jul. 23, 2002

(54) EXPEDITING RECONVERGENCE IN A ROUTING DEVICE

(75) Inventors: William F. Rubino, Chelmsford; Leigh McLellan, Framingham; Geping Chen, Waltham, all of MA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/197,849

(22) Filed: Nov. 23, 1998

(51) Int. Cl.$^7$ ................................................ H04L 1/00
(52) U.S. Cl. .................. 370/241.1; 370/248; 370/395.6
(58) Field of Search ................................ 370/238, 248, 370/249, 395, 410, 216, 220, 228, 236.2, 238.1, 241.1, 395.1, 395.6

(56) References Cited

U.S. PATENT DOCUMENTS

| 5,321,688 A | * | 6/1994 | Nakano et al. ............. 370/244 |
| 5,461,607 A | * | 10/1995 | Miyagi et al. .............. 370/244 |
| 5,475,696 A | * | 12/1995 | Taniguchi ................... 714/775 |
| 5,764,624 A | * | 6/1998 | Endo et al. ................. 370/218 |
| 6,167,025 A | * | 12/2000 | Hsing et al. ................ 370/216 |

OTHER PUBLICATIONS

ATM Forum, ATM User–Network Interface Specification v3.0, Section 3, ATM Layer Specification, pp. 50–103 (Sep. 1993).

ATM Forum, ATM User–Network Interface Specification v3.1, Section 3, ATM Layer Specification pp. 50–103 (1994).

International Telecommunication Union (ITU–T) Recommendation 1.610, B–ISDN Operation and Maintenance Principles and Functions (Mar. 1993).

* cited by examiner

Primary Examiner—Chau Nguyen
Assistant Examiner—D. Trinh

(57) ABSTRACT

A technique for updating a routing table in a routing device operating over a logical connection in a communication network utilizes a mechanism at a first protocol layer to determine a logical connection status and trigger a routing table update at a second protocol layer based upon the logical connection status. Specifically, the first protocol layer logic monitors the status of the logical channels, and, based on the status of the logical channels, determines the status of the logical connections. When the first protocol layer logic detects a logical channel failure that results in a logical connection failure, the first protocol layer logic triggers a routing table update by sending a signal to the second protocol layer logic indicating that the logical connection failed. Likewise, when the first protocol layer logic determines that communication over the failed logical connection is restored, the first protocol layer logic triggers a routing table update by sending a signal to the second protocol layer logic indicating that the logical connection is restored.

14 Claims, 11 Drawing Sheets

| GFC | VPI | VCI | PT (101) | CLP | HEC | CELL TYPE (0001) | FUNCTION TYPE (0000) | FAILURE TYPE | FAILURE LOCATION | UNUSED | CRC |
|---|---|---|---|---|---|---|---|---|---|---|---|
| 602 | 604 | 606 | 608 | 610 | 612 | 614 | 616 | 618 | 620 | 622 | 624 |

←——OAM FUNCTION-SPECIFIC FIELDS——→

| GFC | VPI | VCI | PT (101) | CLP | HEC | CELL TYPE (0001) | FUNCTION TYPE (0001) | FAILURE TYPE | FAILURE LOCATION | UNUSED | CRC |
|---|---|---|---|---|---|---|---|---|---|---|---|
| 702 | 704 | 706 | 708 | 710 | 712 | 714 | 716 | 718 | 720 | 722 | 724 |

| GFC | VPI | VCI | PT (101) | CLP | HEC | CELL TYPE (0001) | FUNCTION TYPE (1000) | LOOPBACK INDICATION (00000001) | COR-RELATION TAG | LOOPBACK LOCATION ID | SOURCE ID | UN-USED | CRC |
|---|---|---|---|---|---|---|---|---|---|---|---|---|---|
| 802 | 804 | 806 | 808 | 810 | 812 | 814 | 816 | 818 | 820 | 822 | 824 | 826 | 828 |

| GFC | VPI | VCI | PT (101) | CLP | HEC | CELL TYPE (0001) | FUNCTION TYPE (1000) | LOOPBACK INDICATION (00000000) | COR-RELATION TAG | LOOPBACK LOCATION ID | SOURCE ID | UN-USED | CRC |
|---|---|---|---|---|---|---|---|---|---|---|---|---|---|
| 902 | 904 | 906 | 908 | 910 | 912 | 914 | 916 | 918 | 920 | 922 | 924 | 926 | 928 |

EXPEDITING RECONVERGENCE IN A ROUTING DEVICE

FIELD OF THE INVENTION

The present invention relates generally to communication networks, and, more particularly, to expediting reconvergence in a routing device.

BACKGROUND OF THE INVENTION

In today's information age, data communication networks are evolving as more and more information is transferred and accessed by electronic means. Specifically, transmission facilities are migrating toward higher speed technologies such as fiber-optic and broadband technologies, and networking devices such as routers and switches are evolving to more efficiently and quickly handle information. In order to realize the potential of these improved data communication networks, it is important for the communication protocols used in the data communication networks to also be efficient.

In order for the communication protocols to be efficient and still be flexible, many communication protocols are implemented in layers (often referred to as a "protocol stack"). Each protocol layer provides a specific set of services to the protocol layer immediately above it in the protocol stack. Although there are different protocol layering schemes in use today, the different protocol layering schemes have certain common attributes. Specifically, protocols at the lowest layer in the protocol stack, typically referred to as the "layer 1" or "physical layer" protocols, define the physical and electrical characteristics for transporting data across a connection. Protocols at the next layer in the protocol stack, typically referred to as the "layer 2" or "data link layer" protocols, define the format of the data transported by the physical layer protocols. Protocols implemented at layer 3 (typically referred to as the "network layer") and above ultimately utilize the services provided by the data link layer protocols to transport information within the communication network.

In a common networking model, the communication network includes a number of interconnected routers that route information from a source to a destination. Each router maintains a connection to at least one other router, and typically to two or more other routers. For convenience, the connection between two routers is referred to hereinafter as a "logical connection."

Generically, each logical connection consists of one or more communication channels (referred to hereinafter as "logical channels"). A logical channel can be a physical communication channel or a virtual communication channel. Specifically, a logical channel can be a physical layer channel or subchannel (for example, a subchannel derived through time-division multiplexing, frequency-division multiplexing, code-division multiplexing, wavelength-division multiplexing, or other physical layer multiplexing scheme) or a virtual channel at another protocol layer (for example, a virtual channel derived through packet switching, frame relay switching, cell switching, or other multiplexing scheme, typically at the data link layer). For convenience, the protocol layer at which the logical channels are supported is referred to hereinafter as the "logical channel protocol layer." Also for convenience, a logical connection is considered to be "active" if at least one of its constituent logical channels is active.

In order to route information from a source to a destination across the network, each router maintains a routing table that effectively maps the destination to one of the logical connections supported by the router. The router selects a preferred logical connection for the destination based upon, among other things, routing information received from the other routers in the network. Specifically, the routers in the network exchange routing information using a routing protocol, such as the Routing Information Protocol (RIP) or the Open Shortest Path First (OSPF) protocol, that is implemented at a routing protocol layer above the logical channel protocol layer. The router uses the routing information it receives from the other routers to determine the preferred logical connection for the destination and to update its routing table accordingly.

Of course, the preferred logical connection for the destination may change over time due to congestion or outages in the network. Therefore, the router routinely exchanges routing information with the other routers in the network so that the router can update its routing table to adapt to network changes. Specifically, if the preferred logical connection becomes unusable (for example, due to a failure of all of its constituent logical channels) such that an alternate logical connection must be used, or the preferred logical connection otherwise becomes less desirable than the alternate logical connection (for example, due to congestion on the preferred logical connection), then the router updates its routing table to map the destination to the alternate logical connection. Likewise, if the preferred logical connection subsequently becomes usable or otherwise becomes more desirable than the alternate logical connection, then the router updates its routing table to map the destination back to the preferred logical connection. For convenience, the process of dynamically updating the routing table in response to network changes is referred to hereinafter as "reconvergence."

Therefore, when the preferred logical connection becomes unusable due to a failure of all of its constituent logical channels, the router reconfigures its routing table to bypass the failed logical connection. Although the logical channel protocol layer may detect the logical channel failures quickly, the router typically does not update its routing table until the communication failure is detected by the routing protocol operating at the routing protocol layer. In a large network having many routers, it can take a substantial amount of time for the routing protocol to detect the communication failure. For example, in one prior art embodiment in which the router uses the OSPF routing protocol, it can take up to three (3) minutes for the OSPF protocol to determine that the preferred logical connection failed. Thus, there can be a significant period of time following the communication failure when the router continues routing information over the failed logical connection rather than re-routing the information to the alternate logical connection. As a result, a significant amount of data can be lost (a problem that is only magnified by the high-speed transmission facilities used in the network), and user sessions, which typically have time out periods significantly shorter than three (3) minutes, can time out such that they must be re-established after communication is restored. In worst case scenarios, the significant delay in detecting the communication failure and updating the routing tables can lead to network outages.

Similarly, when communication over the preferred logical connection is restored, the router typically reconfigures its routing table to use the restored logical connection. Again, the logical channel protocol layer may detect the restored logical channels quickly, but the router typically does not update its routing table until the restored logical connection is detected by the routing protocol operating at the routing protocol layer. Thus, there can be a significant period of time following restoral of the preferred logical connection when the router continues routing information over the alternate logical connection rather than rerouting the information to the preferred logical connection. This can perpetuate additional network delays and congestion when the alternate logical connection provides a less optimal routing path than the preferred logical connection.

Thus, a need has remained for a mechanism by which the router can quickly reconverge when the status of a logical connection changes.

SUMMARY OF THE INVENTION

In accordance with one aspect of the invention, first protocol layer logic at a first protocol layer of a protocol stack monitors the status of the logical connection, and triggers routing table updates at a second protocol layer of the protocol stack based on the status of the logical connection.

In accordance with another aspect of the invention, the first protocol layer logic determines that the logical connection failed, and triggers the routing table update at the second protocol layer to bypass the failed logical connection.

In accordance with yet another aspect of the invention, the first protocol layer logic determines that the logical connection has been restored following a logical connection failure, and triggers the routing table update at the second protocol layer to use the restored logical connection.

In various embodiments of the invention, the logical connection comprises one or more physical layer communication channels, one or more physical layer communication subchannels (for example, time-division multiplexed subchannels, frequency-division multiplexed subchannels, code-division multiplexed subchannels, wavelength-division multiplexed subchannels, or other multiplexed subchannels), or one or more virtual channels at a data link layer or other protocol layer. The second protocol layer can be a network protocol layer, a routing protocol layer, or other protocol layer.

BRIEF DESCRIPTION OF THE DRAWINGS

The foregoing and other objects and advantages of the invention will be appreciated more fully from the following further description thereof with reference to the accompanying drawings wherein:

FIG. 6 shows the format of an ATM F5 OAM Alarm Indication Signal cell in accordance with a preferred embodiment of the present invention;

FIG. 7 shows the format of an ATM F5 OAM Far End Receive Failure signal cell in accordance with a preferred embodiment of the present invention;

FIG. 8 shows the format of an ATM F5 OAM End-to-End Loopback signal cell in accordance with a preferred embodiment of the present invention;

FIG. 9 shows the format of a return ATM F5 OAM End-to-End Loopback signal cell in accordance with a preferred embodiment of the present invention;

DETAILED DESCRIPTION OF A PREFERRED EMBODIMENT

Figure 1:
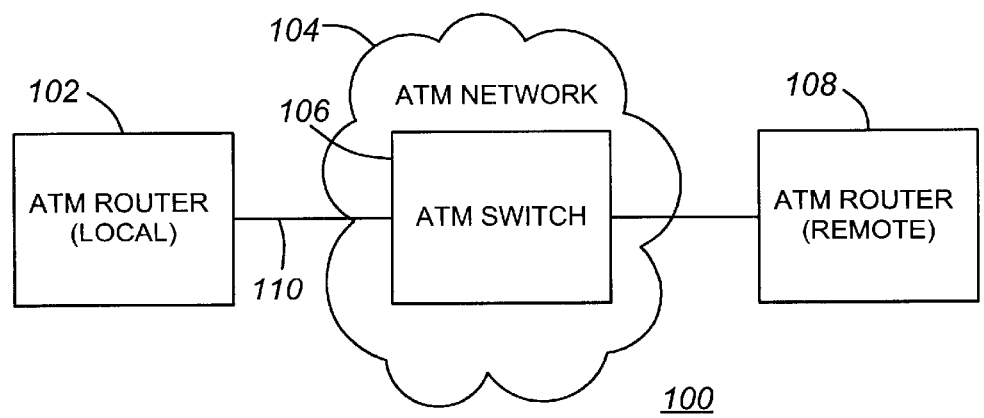
FIG. 1 is a block diagram showing an exemplary ATM network in accordance with a preferred embodiment of the present invention.

As discussed above, a need has remained for a mechanism by which the router can quickly reconverge when the status of a logical connection changes. The present invention provides such a mechanism by monitoring the status of the logical connections using a mechanism at a first protocol layer (which can be the logical channel protocol layer or another protocol layer), and having the first protocol layer trigger routing table updates at a second protocol layer based on the status of the logical connections. Specifically, the first protocol layer logic monitors the status of the logical channels, and, based on the status of the logical channels, determines the status of the logical connections. When the first protocol layer logic detects a logical channel failure that results in a logical connection failure, the first protocol layer logic triggers a routing table update by sending a signal to the second protocol layer logic indicating that the logical connection failed. Likewise, when the first protocol layer logic determines that communication over the failed logical connection is restored, the first protocol layer logic triggers a routing table update by sending a signal to the second protocol layer logic indicating that the logical connection is restored. Thus, by having the first protocol layer logic trigger the routing table update rather than waiting for the routing protocol to trigger the routing table update, the router is able to reconverge quickly following a logical connection status change.

In a preferred embodiment of the present invention, the routers communicate over an Asynchronous Transfer Mode (ATM) network. ATM is an efficient protocol that is typically implemented at the data link layer of the protocol stack (referred to hereinafter as the "ATM protocol layer"). ATM uses fixed-length cells to carry data across the ATM network.

Each ATM cell is 53 bytes in length, and includes a 5-byte header field in which addressing information is carried and a 48-byte data field in which a portion of the data is carried. The addressing information in the header field allows intermediate nodes in the ATM network, such as ATM routers and switches, to quickly process and route each cell.

Within the ATM network, ATM cells are transported over ATM virtual circuits that are established at the ATM protocol layer. One type of ATM virtual circuit supported by the ATM networks is a Permanent Virtual Circuit (PVC). A PVC is an ATM virtual circuit that is established once and remains active so long as the ATM network is operational. Furthermore, the PVC is automatically restored following a PVC failure.

In a typical ATM network, the ATM routers are interconnected and communicate over ATM PVCs. More specifically, each ATM router maintains a separate logical connection to each of a number of other ATM routers, where each logical connection consists of one or more PVCs. A logical connection is considered to be active if at least one of its constituent PVCs is active.

FIG. 1 is a block diagram showing an exemplary communication network 100 in accordance with a preferred embodiment of the present invention. The communication network 100 includes a first ATM router 102 (referred to hereinafter as the "local ATM router") in communication with a second ATM router 108 (referred to hereinafter as the "remote ATM router") over an ATM network 104, and specifically over a PVC 110. The ATM network 104 includes an ATM switch 106 for, among other things, processing ATM cells on the PVC 110.

Figure 2:
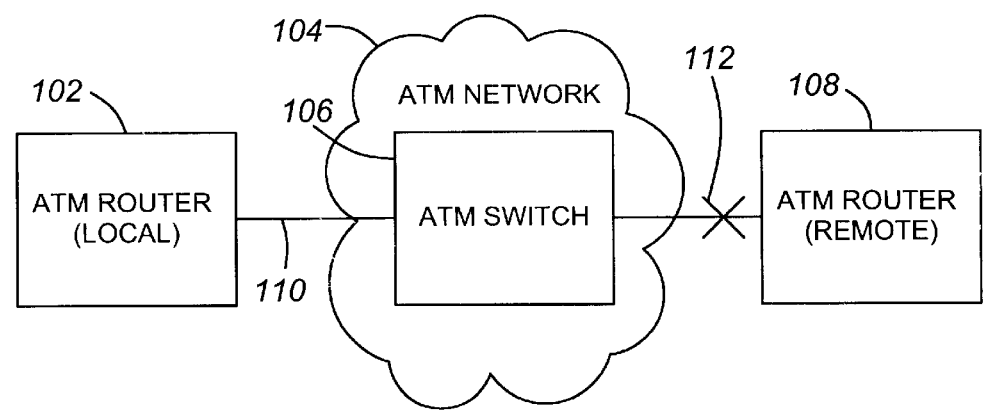
FIG. 2 is a block diagram showing the exemplary ATM network with a PVC failure in accordance with a preferred embodiment of the present invention.

The ATM protocol layer interface between the ATM routers 102 and 108 and the ATM network 104 is defined and described in the ATM User-Network Interface Specification Version 3.0 (published by PTR Prentice Hall for The ATM Forum, 1993), incorporated herein by reference in its entirety, and is further defined and described in the ATM User-Network Interface Specification Version 3.1, incorporated herein by reference in its entirety (referred to collectively as the "ATM Protocol Specification"). Among other things, the ATM Protocol Specification defines a set of ATM management functions that can be used by the ATM router to determine the status of its supported PVCs. More specifically, the ATM Protocol Specification defines a number of ATM F5 Operation and Maintenance (OAM) flows that allow the ATM router to detect a PVC failure, such as the PVC failure 112 as shown in FIG. 2, and also to determine when the PVC failure, such as the PVC failure 112, has been resolved. Two of the ATM management functions that utilize the ATM F5 OAM flows are alarm surveillance and connectivity verification.

Figure 3:
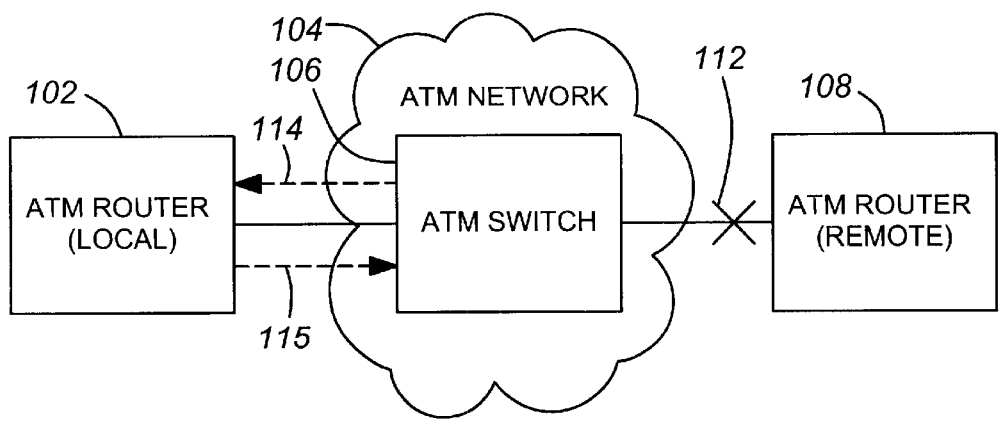
FIG. 3 is a block diagram showing an embodiment of the present invention in which an alarm surveillance mechanism is used to determine the status of the PVC.

Alarm surveillance is a mechanism by which the ATM router is explicitly notified when a PVC failure occurs. With reference to FIG. 3, the ATM switch 106 monitors the status of the PVC 110. When the ATM switch 106 detects the PVC failure 112, the ATM switch 106 transmits an Alarm Indication Signal (AIS) 114 to the local ATM router 102. Upon receiving the AIS 114, the local ATM router 102 may, but is not required to, transmit a Far End Receive Failure (FERF) signal 115 (also referred to as a "Remote Defect Indication" signal). The purpose of the FERF signal 115 is to notify any intermediate nodes between the local ATM router 102 and the ATM switch 106 (not shown in the figure) that the PVC 110 has failed.

FIG. 6 shows the ATM cell format of the AIS 114. The AIS 114 cell header includes a General Flow Control (GFC) field 602, a Virtual Path Identifier (VPI) field 604, a Virtual Channel Identifier (VCI) field 606, a Payload Type (PT) field 608, a Cell Loss Priority (CLP) field 610, and a Header Error Check (HEC) field 612. The VPI field 604 and the VCI field 606 are set equal to the VPI and VCI associated with the PVC 110, respectively. The PT field 608 is set equal to the binary value (101) to indicate an end-to-end message flow. The AIS 114 cell payload includes a Cell Type field 614, a Function Type field 616, a Failure Type field 618, a Failure Location field 620, an Unused field 622, and a Cyclic Redundancy Check (CRC) field 624. The Cell Type field 614 is set equal to the binary value (0001) to indicate that the cell is an OAM cell. The Function Type field 616 is set equal to the binary value (0000) to indicate that the OAM cell is an AIS cell. The Failure Type field 618 and the Failure Location field 620 are not used in a preferred embodiment of the present invention.

FIG. 7 shows the ATM cell format of the FERF signal 115. The FERF signal 115 cell header includes a General Flow Control (GFC) field 702, a Virtual Path Identifier (VPI) field 704, a Virtual Channel Identifier (VCI) field 706, a Payload Type (PT) field 708, a Cell Loss Priority (CLP) field 710, and a Header Error Check (HEC) field 712. The VPI field 704 and the VCI field 706 are set equal to the VPI and VCI associated with the PVC 110, respectively. The PT field 708 is set equal to the binary value (101) to indicate and end-to-end message flow. The FERF signal 115 cell payload includes a Cell Type field 714, a Function Type field 716, a Failure Type field 718, a Failure Location field 720, an Unused field 722, and a Cyclic Redundancy Check (CRC) field 724. The Cell Type field 714 is set equal to the binary value (0001) to indicate that the cell is an OAM cell. The Function Type field 716 is set equal to the binary value (0001) to indicate that the OAM cell is a FERF cell. The Failure Type field 718 and the Failure Location field 720 are not used in a preferred embodiment of the present invention.

In a typical embodiment utilizing alarm surveillance, the ATM switch 106 transmits the AIS 114 to the local ATM router 102 upon detecting the PVC failure 112, and thereafter periodically retransmits the AIS 114 to the local ATM router 102 while the PVC failure 112 persists, preferably at one (1) second intervals. The ATM switch 106 stops retransmitting the AIS 114 upon detecting that the PVC has been restored. Thus, the local ATM router 102 is able to determine the status of the PVC 110 by monitoring for the AIS 114 transmissions from the ATM switch 106. Specifically, the local ATM router 102 is able to determine that the PVC failed upon receiving the first AIS 114. Thereafter, the local ATM router 102 monitors for the periodic AIS 114 retransmissions. As long as the local ATM router 102 receives periodic AIS 114 retransmissions, the local ATM router 102 is able to determine that the PVC failure 112 persists. However, if at any time the local ATM router 102 does not receive an AIS 114 within a predetermined amount of time, preferably three (3) seconds, then the local ATM router 102 is able to determine that the PVC failure 112 has been resolved.

Figure 4:
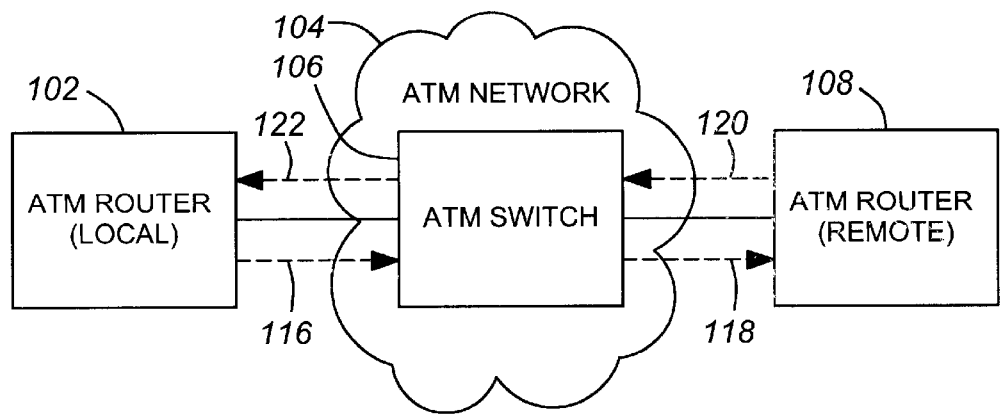
FIG. 4 is a block diagram showing an embodiment of the present invention in which a connectivity verification mechanism is used to determine the status of the PVC.

Connectivity verification is a mechanism by which the ATM router actively monitors the status of the PVC. With reference to FIG. 4, the local ATM router 102 periodically transmits an End-to-End Loopback signal 116 to the remote ATM router 108 over the PVC 110, preferably at five (5) second intervals. Intermediate nodes in the ATM network 104, such as the ATM switch 106, are required to forward the End-to-End Loopback signal 116 unchanged. Therefore, the ATM switch 106 forwards the End-to-End Loopback signal 116 to the remote ATM router 108 as End-to-End Loopback signal 118. Upon receiving the End-to-End Loopback signal 118, the remote ATM router 108 transmits a return End-to-End Loopback signal 120 to the local ATM router 102. Again, intermediate nodes in the ATM network 104, such as the ATM switch 106, are required to forward the return End-to-End Loopback signal 120 unchanged. Therefore, the ATM switch 106 forwards the return End-to-End Loopback signal 120 to the local ATM router 102 as return End-to-End Loopback signal 122.

Figure 5:
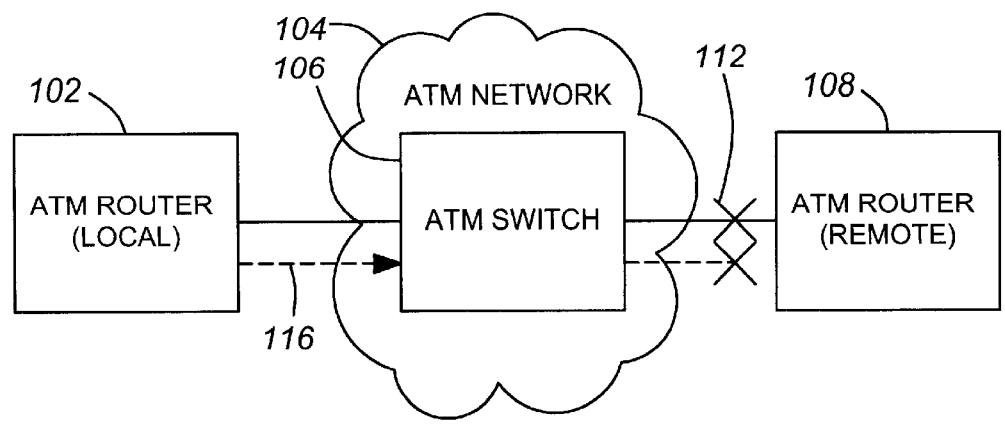
FIG. 5 is a block diagram showing an embodiment of the present invention in which the PVC failure prevents the connectivity verification mechanism from successfully completing a remote loopback test.

Of course, the local ATM router 102 will only receive the return End-to-End Loopback signal 122 in response to the transmitted End-to-End Loopback signal 116 if there is no PVC failure between the local ATM router 102 and the remote ATM router 108. Therefore, as long as the local ATM router 102 continues to receive the return End-to-End Loopback signal 122 in response to its transmitted End-to-End Loopback signals 116, the local ATM router 102 considers the PVC 110 to be active. However, if the local ATM router 102 fails to receive the return End-to-End Loopback signal 122 in response to the transmitted End-to-End Loopback signal 116 (or in response to a predetermined number of consecutive loopback attempts), as shown in FIG. 5, then the local ATM router 102 considers the PVC 110 to be failed.

FIG. 8 shows the ATM cell format of the End-to-End Loopback signals 116 and 118. The cell header of the End-to-End Loopback signals 116 and 118 includes a General Flow Control (GFC) field 802, a Virtual Path Identifier (VPI) field 804, a Virtual Channel Identifier (VCI) field 806, a Payload Type (PT) field 808, a Cell Loss Priority (CLP) field 810, and a Header Error Check (HEC) field 812. The VPI field 804 and the VCI field 806 are set equal to the VPI and VCI associated with the PVC 110, respectively. The PT field 808 is set equal to the binary value (101) to indicate and end-to-end message flow. The cell payload of the End-to-End Loopback signals 116 and 118 includes a Cell Type field 814, a Function Type field 816, a Loopback Indication field 818, a Correlation Tag field 820, a Loopback Location Identifier (ID) field 822, a Source Identifier (ID) field 824, an Unused field 826, and a Cyclic Redundancy Check (CRC) field 828. The Cell Type field 814 is set equal to the binary value (0001) to indicate that the cell is an OAM cell. The Function Type field 816 is set equal to the binary value (1000) to indicate that the OAM cell is a loopback cell. The Loopback Indication field 818 is set equal to the binary value (00000001) to force the remote ATM router 108 to transmit a return End-to-End Loopback signal (described in detail below) back to the local ATM router 102. The Correlation Tag field 820,is set equal to an identifiable value that is included by the remote ATM router 108 in the return End-to-End Loopback signal so that the local ATM router 102 can correlate the return End-to-End Loopback signal with the End-to-End Loopback signal 116. The Loopback Location ID field 822 and the Source ID field 824 are not used in a preferred embodiment of the present invention.

FIG. 9 shows the ATM cell format of the return End-to-End Loopback signals 120 and 122. The cell header of the return End-to-End Loopback signals 120 and 122 includes a General Flow Control (GFC) field 902, a Virtual Path Identifier (VPI) field 904, a Virtual Channel Identifier (VCI) field 906, a Payload Type (PT) field 908, a Cell Loss Priority (CLP) field 910, and a Header Error Check (HEC) field 912. The VPI field 904 and the VCI field 906 are set equal to the VPI and VCI associated with the PVC 110, respectively. The PT field 908 is set equal to the binary value (101) to indicate and end-to-end message flow. The cell payload of the return End-to-End Loopback signals 120 and 122 includes a Cell Type field 914, a Function Type field 916, a Loopback Indication field 918, a Correlation Tag field 920, a Loopback Location Identifier (ID) field 922, a Source Identifier (ID) field 924, an Unused field 926, and a Cyclic Redundancy Check (CRC) field 928. The Cell Type field 914 is set equal to the binary value (0001) to indicate that the cell is an OAM cell. The Function Type field 916 is set equal to the binary value (1000) to indicate that the OAM cell is a loopback cell. The Loopback Indication field 918 is set equal to the binary value (00000000) to indicate that the cell was looped back by the remote ATM router 108. The Correlation Tag field 920 is set equal to the value from the Correlation Tag field 820 in the End-to-End Loopback signal 118. The Loopback Location ID field 922 and the Source ID field 924 are not used in a preferred embodiment of the present invention.

In a typical embodiment utilizing connectivity verification, the local ATM router 102 is able to determine the status of the PVC 110 by periodically transmitting the End-to-End Loopback signal 116 and monitoring for the return End-to-End Loopback signal 122. Specifically, the local ATM router 102 is able to determine that the PVC failed upon transmitting the End-to-End Loopback signal 116 and failing to receive the return End-to-End Loopback signal 122. Thereafter, the local ATM router 102 continues periodically transmitting the End-to-End Loopback signal 116 and monitoring for the return End-to-End Loopback signal 122. As long as the local ATM router 102 fails to receive the return End-to-End Loopback signal 122 in response to the End-to-End Loopback signal 116, the local ATM router 102 is able to determine that the PVC failure 112 persists. However, if the local ATM router 102 receives the return End-to-End Loopback signal 122 in response to the End-to-End Loopback signal 116, then the local ATM router 102 is able to determine that the PVC failure 112 has been resolved.

Although alarm surveillance and connectivity verification can be used at the same time for monitoring the status of PVCs, it is preferable that only one or the other mechanism be used at a time. In a preferred embodiment of the present invention, the local ATM router 102 can be configured to use either the alarm surveillance mechanism or the connectivity verification mechanism. If the ATM switch 106 is known to generate the AIS 114 upon detection of a PVC failure, then the local ATM router 102 is typically configured to use the alarm surveillance mechanism and to disable the connectivity verification mechanism. On the other hand, if the ATM switch 106 does not generate the AIS 114 upon detection of a PVC failure, then the local ATM router 102 is typically configured to use the connectivity verification mechanism and to disable the alarm surveillance mechanism.

Thus, the local ATM router 102 uses one of the ATM mechanisms to monitor the status of the PVC 110. When a PVC failure detected at the ATM protocol layer, such as the PVC failure 112, results in a failure of the corresponding logical connection, a signal is sent to the network layer protocol indicating that the logical connection failed. Upon receiving the signal, the network layer protocol forces a routing table update to bypass the failed logical connection and re-route information to an alternate logical connection.

The local ATM router 102 continues monitoring the status of the failed PVC. When the PVC is restored at the ATM protocol layer, a signal is sent to the network layer protocol indicating that the logical connection is restored. Upon receiving the signal, the network layer protocol forces a routing table update to re-route information to the restored logical connection.

Figure 10A:
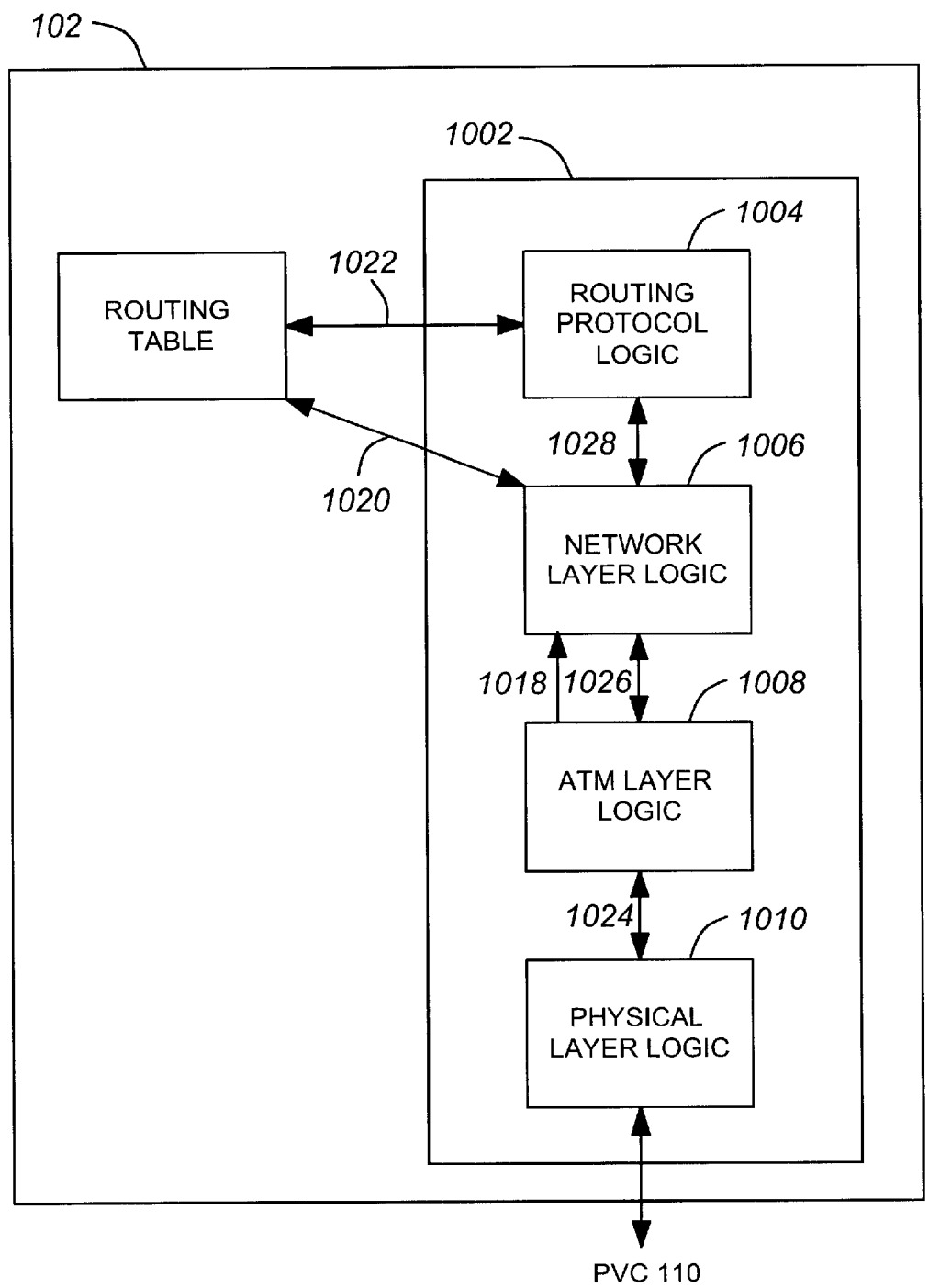
FIG. 10A is a block diagram showing an exemplary ATM router in accordance with a preferred embodiment of the present invention.

FIG. 10A is a block diagram of an exemplary local ATM router 102 showing the relevant logic blocks for implementing a preferred embodiment of the present invention. Among other things, the local ATM router 102 includes a protocol stack 1002. The protocol stack 1002 includes Physical Layer Logic 1010, ATM Layer Logic 1008, Network Layer Logic 1006, and Routing Protocol Logic 1004.

The Physical Layer Logic 1010 provides the physical and electrical interface for transmitting and receiving ATM cells over the logical connection. ATM cells received from the ATM Layer Logic 1008 over the interface 1024 are formatted by the Physical Layer Logic 1010 and transmitted over the logical connection. ATM cells received by the Physical Layer Logic 1010 over the logical connection are forwarded to the ATM Layer Logic 1008 over the interface 1024.

The ATM Layer Logic 1008 provides the ATM protocol layer functions for managing the logical connections and for transmitting and receiving ATM cells over the logical connections. Specifically, the ATM Layer Logic 1008 includes logic for formatting ATM cells for transmission over the logical connection, logic for processing ATM cells received over the logical connection and forwarded to the ATM Layer Logic 1008 by the Physical Layer Logic 1010, and logic for managing the logical connections for the local ATM router 102.

The ATM Layer Logic 1008 formats ATM cells for transmission over the logical connection. Certain types of ATM cells, such as ATM F5 OAM cells, are generated by the ATM Layer Logic 1008 and have significance only at the ATM protocol layer. Other types of ATM cells carry information received from the Network Layer Logic 1006 over the interface 1026. In order to transmit the ATM cells over the logical connection, the ATM Layer Logic 1008 forwards the ATM cells to the Physical Layer Logic 1010 over the interface 1024.

The ATM Layer Logic 1008 processes ATM cells received over the logical connection and forwarded to the ATM Layer Logic 1008 by the Physical Layer Logic 1010. Certain types of ATM cells, such as ATM F5 OAM cells, carry information intended for the ATM Layer Logic 1008, while other types of cells carry information intended for the Network Layer Logic 1006. Therefore, upon receiving an ATM cell from the Physical Layer Logic 1010 over the interface 1024, the ATM Layer Logic 1008 determines whether the cell carries information intended for the ATM Layer Logic 1008 or the Network Layer Logic 1006. If the cell carries information intended for the ATM Layer Logic 1008, then the cell is processed internally by the ATM Layer Logic 1008. However, if the cell carries information intended for the Network Layer Logic 1006, then the ATM Layer Logic 1008 extracts the information from the cell and forwards the information to the Network Layer Logic 1006 over the interface 1026.

The ATM Layer Logic 1008 manages the logical connections for the local ATM router 102. Among other things, the ATM Layer Logic 1008 includes logic for determining the status of the logical connections. In a preferred embodiment of the present invention, the ATM Layer Logic 1008 includes logic for detecting a failure of the logical connection as well as logic for determining when communication over the failed logical connection has been restored.

Upon detecting the failure of the logical connection, the ATM Layer Logic 1008 sends a signal to the Network Layer Logic 1006 over the interface 1018 indicating that the logical connection failed. This prompts the Network Layer Logic 1006 to delete the logical connection from the routing table 1012 over the interface 1020, which in turn prompts the Routing Protocol Logic 1004 to select an alternate logical connection, update the routing table 1012 to re-route information to the alternate logical connection, and advertise the updated routing information to the other ATM routers.

Likewise, upon determining that communication over the failed logical connection has been restored, the ATM Layer Logic 1008 sends a signal to the Network Layer Logic 1006 over the interface 1018 indicating that the logical connection has been restored. This prompts the Network Layer Logic 1006 to add the logical connection to the routing table 1012 over the interface 1020, which in turn prompts the Routing Protocol Logic 1004 to update the routing table 1012 to re-route information to the restored logical connection and advertise the updated routing information to the other ATM routers.

In order to advertise updated routing information to the other ATM routers, the Routing Protocol Logic 1004 formats routing information packets and forwards the routing information packets to the Network Layer Logic 1006 over the interface 1028. Upon receiving the routing information packets from the Routing Protocol Logic 1004 over the interface 1028, the Network Layer Logic 1006 formats network layer information packets and forwards the network layer information packets to the ATM Layer Logic 1008 over the interface 1026. Upon receiving the network layer information packets from the Network Layer Logic 1006 over the interface 1026, the ATM Layer Logic 1008 formats ATM cells and forwards the ATM cells to the Physical Layer Logic 1010 over the interface 1024. The Physical Layer Logic 1010 transmits the ATM cells over the connection, and specifically over the PVC designated by the ATM cells.

Figure 10B:
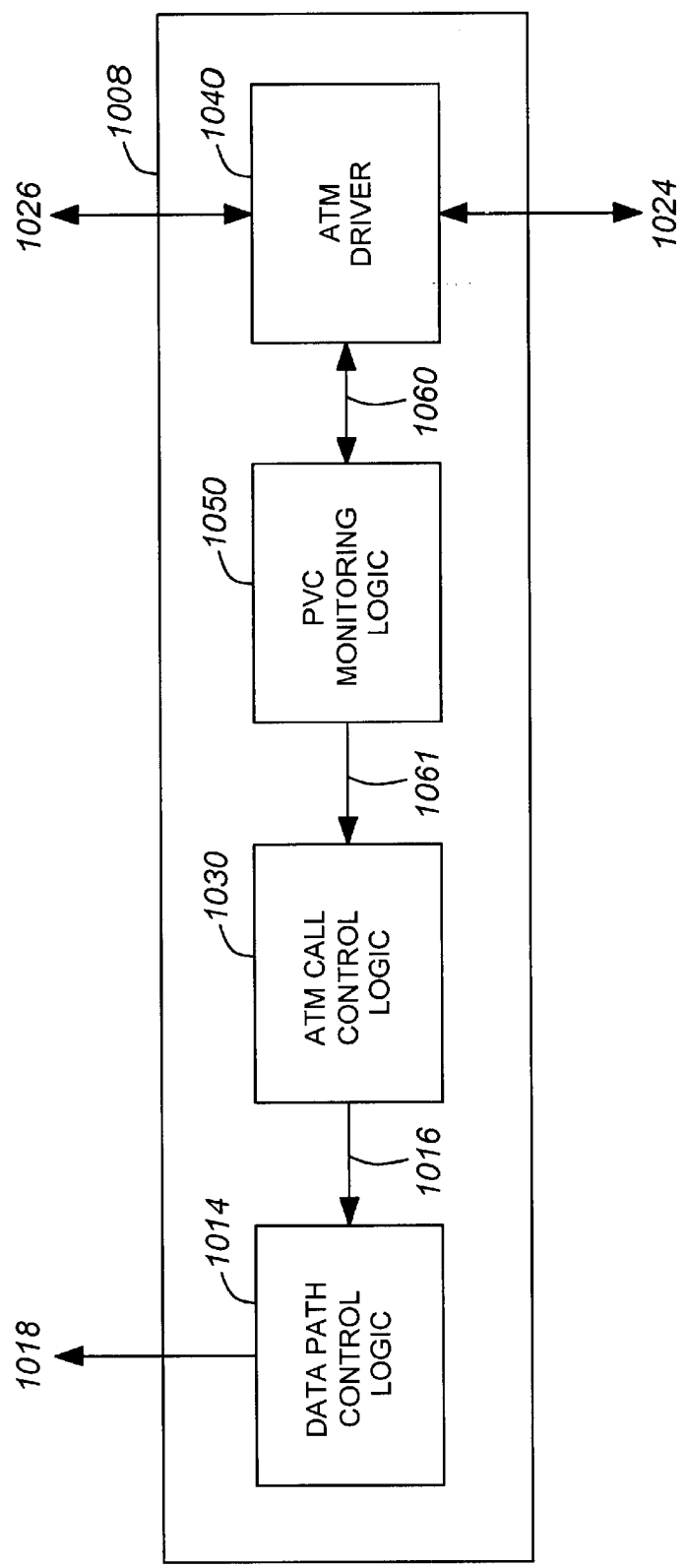
FIG. 10B is a block diagram showing an exemplary embodiment of ATM Layer Logic in accordance with a preferred embodiment of the present invention.

FIG. 10B is a block diagram showing the ATM Layer Logic 1008 in greater detail. The ATM Layer Logic 1008 includes ATM Driver 1040 for formatting and processing ATM cells. The ATM Driver 1040 is operably coupled to the interface 1026 for exchanging network layer information with the Network Layer Logic 1006, and is also operably coupled to the interface 1024 for exchanging ATM cells with the Physical Layer Logic 1010.

The ATM Layer Logic 1008 also includes PVC Monitoring Logic 1050. The PVC Monitoring Logic 1050 is operably coupled to monitor the status of the PVCs, including the PVC 110, for the local ATM router 102. Specifically, the PVC Monitoring Logic 1050 utilizes the alarm surveillance mechanism or the connectivity verification mechanism to determine the status of the PVCs. When the PVC Monitoring Logic 1050 determines that a PVC failed, it sends a signal to the ATM Call Control Logic 1030 over the interface 1061 indicating that the PVC failed. Likewise, when the PVC Monitoring Logic 1050 determines that a failed PVC has been restored, it sends a signal to the ATM Call Control Logic 1030 over the interface 1061 indicating that the PVC has been restored. The PVC Monitoring Logic 1050 is described in more detail with respect to FIG. 10C below.

The ATM Call Control Logic 1030 manages ATM PVCs, including the PVC 110, for the local ATM router 102. The ATM Call Control Logic 1030 is operably coupled to receive PVC status information from the PVC Monitoring Logic 1050 over the interface 1061 and to relay the PVC status information to the Data Path Control Logic 1014. Specifically, when the ATM Call Control Logic 1030 receives the signal from the PVC Monitoring Logic 1050 indicating that the PVC failed, the ATM Call Control Logic 1030 sends a signal to the Data Path Control Logic 1014 indicating that the PVC failed. Likewise, when the ATM Call Control Logic 1030 receives the signal from the PVC Monitoring Logic 1050 indicating that the PVC is restored, the ATM Call Control Logic 1030 sends a signal to the Data Path Control Logic 1014 indicating that the PVC is restored.

The Data Path Control Logic 1014 manages logical connections for the local ATM router 102. Among other things, the Data Path Control Logic 1014 maintains a list of logical connections supported by the local ATM router 102, and, for each logical connection, a list of the PVCs associated with the logical connection. Upon receiving the signal from the ATM Call Control Logic 1030 indicating that the PVC failed, the Data Path Control Logic 1014 determines the corresponding logical connection for the failed PVC, and further determines whether the failed PVC was the last active PVC for the logical connection. If the failed PVC was the last active PVC for the logical connection, then the Data Path Control Logic 1014 sends the signal to the Network Layer Logic 1006 over the interface 1018 indicating that the logical connection failed. Otherwise, no signal is sent to the Network Layer Logic 1006 over the interface 1018.

Likewise, upon receiving the signal indicating that the PVC has been restored, the Data Path Control Logic 1014 determines the corresponding logical connection for the PVC 110, and further determines whether the PVC 110 is the first restored or active PVC associated with the logical connection. If the PVC 110 is the first restored or active PVC associated with the logical connection, then the Data Path Control Logic 1014 sends the signal to the Network Layer Logic 1006 over the interface 1018 indicating that the logical connection has been restored. Otherwise, no signal is sent to the Network Layer Logic 1006 over the interface 1018.

Figure 10C:
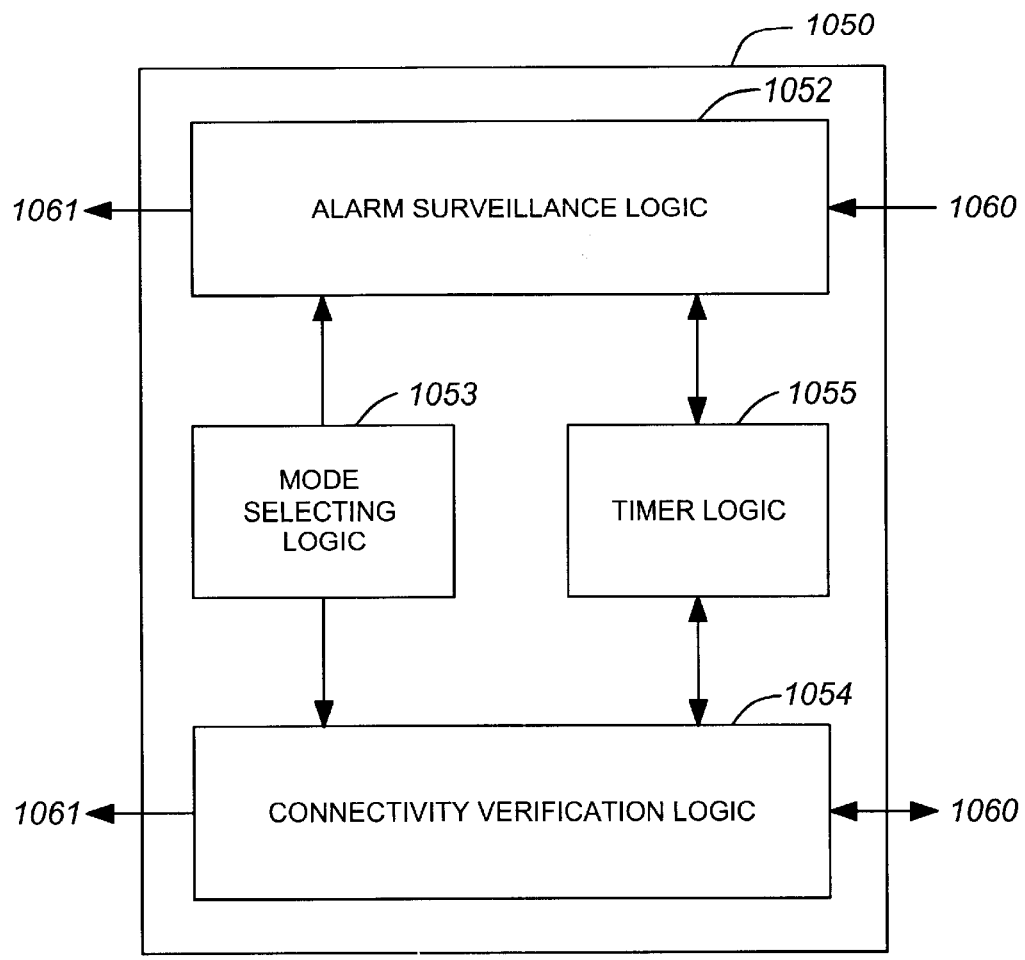
FIG. 10C is a block diagram showing an exemplary embodiment of PVC Monitoring Logic in accordance with a preferred embodiment of the present invention.

FIG. 10C is a block diagram showing the PVC Monitoring Logic 1050 in greater detail. In a preferred embodiment of the present invention as shown in FIG. 10C, the PVC Monitoring Logic 1050 supports two modes of operation. In a first mode of operation, the Alarm Surveillance Logic 1052 is enabled, while the Connectivity Verification Logic 1054 is disabled. In a second mode of operation, the Connectivity Verification Logic 1054 is enabled, while the Alarm Surveillance Logic 1052 is disabled. The PVC Monitoring Logic 1050 includes Mode Selecting Logic 1053 for selecting the first mode of operation or the second mode of operation.

Figure 11:
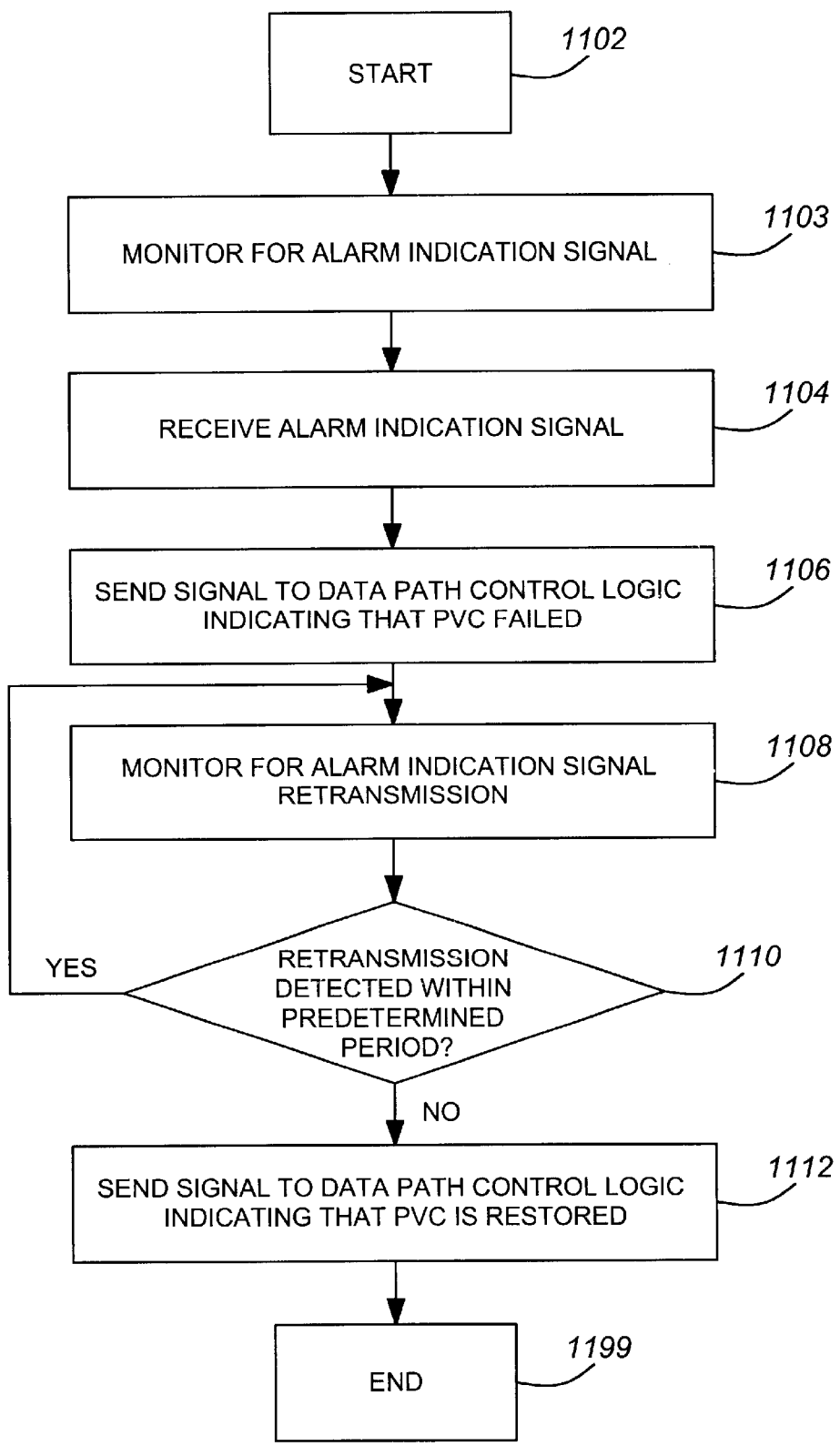
FIG. 11 is a logic flow diagram showing exemplary alarm surveillance logic for determining the status of the PVC at the ATM protocol layer.

When the Alarm Surveillance Logic 1052 is enabled, the Alarm Surveillance Logic 1052 is operably coupled to determine the status of the PVC 110 by monitoring for AIS 114 transmissions from the ATM switch 106. Specifically, the Alarm Surveillance Logic 1052 performs the logic steps shown in FIG. 11. The Alarm Surveillance Logic 1052 begins in step 1102, and proceeds to monitor for the AIS 114 transmission from the ATM switch 106, in step 1103. The ATM Driver 1040 receives the AIS 114 transmission from the ATM switch 106, and forwards the AIS 114 to the Alarm Surveillance Logic 1052 over the interface 1060. Upon receiving the AIS 114 from the ATM Driver 1040 over the interface 1060, in step 1104, the Alarm Surveillance Logic 1052 sends the signal to the ATM Call Control Logic 1030 over the interface 1061 indicating that the PVC failed, in step 1106. The Alarm Surveillance Logic 1052 then monitors for AIS 114 retransmissions from the ATM switch 106, in step 1108. Again, the ATM Driver 1040 receives any AIS 114 retransmissions from the ATM switch 106, and forwards them to the Alarm Surveillance Logic 1052 over the interface 1060. If the Alarm Surveillance Logic 1052 detects an AIS 114 retransmission within a predetermined timeout period, preferably three (3) seconds, that is measured using the Timer Logic 1055 (YES in step 1110), then the Alarm Surveillance Logic 1052 recycles to step 1108 to continue monitoring for AIS 114 retransmissions. However, if the Alarm Surveillance Logic 1052 detects no AIS 114 retransmission within the predetermined timeout period that is measured using the Timer Logic 1055 (NO in step 1110), then the Alarm Surveillance Logic 1052 sends the signal to the ATM Call Control Logic 1030 over the interface 1061 indicating that the PVC is restored, in step 1112. A single iteration of the Alarm Surveillance Logic 1052 terminates in step 1199, although a preferred embodiment typically continues monitoring the status of the PVC 110 by re-starting or recycling to step 1102.

Figure 12:
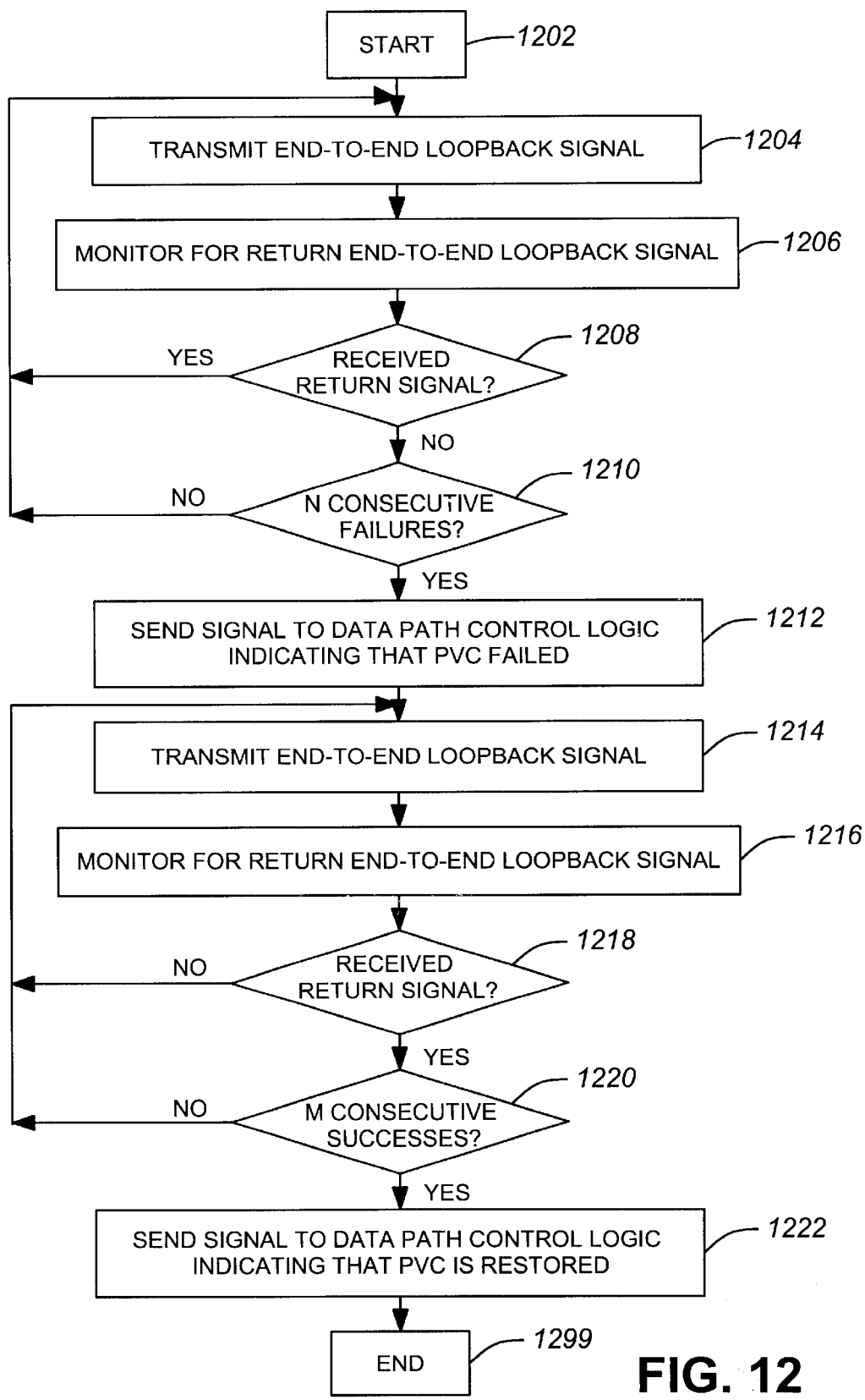
FIG. 12 is a logic flow diagram showing exemplary connectivity verification logic for determining the status of the PVC at the ATM protocol layer.

When the Connectivity Verification Logic 1054 is enabled, the Connectivity Verification Logic 1054 is operably coupled to determine the status of the PVC 110 by periodically transmitting the End-to-End Loopback signal 116 and monitoring for the return End-to-End Loopback signal 122. Specifically, the Connectivity Verification Logic 1054 performs the logic steps shown in FIG. 12. The Connectivity Verification Logic 1054 begins in step 1202, and proceeds to transmit the End-to-End Loopback signal 116 to the remote ATM router 108, in step 1204, by forwarding the End-to-End Loopback signal 116 to the ATM Driver 1040 over the interface 1060. The Connectivity Verification Logic 1054 then monitors for the return End-to-End Loopback signal 122 from the remote ATM router 108, in step 1206. The ATM Driver 1040 receives the return End-to-End Loopback signal 122 transmission, and forwards the return End-to-End Loopback signal 122 to the Connectivity Verification Logic 1054 over the interface 1060. If the Connectivity Verification Logic 1054 receives the return End-to-End Loopback signal 122 within a predetermined timeout period that is measured using the Timer Logic 1055 (YES in step 1208), then the Connectivity Verification Logic 1054 recycles to step 1204 to transmit another End-to-End Loopback signal 116. However, if the Connectivity Verification Logic 1054 does not receive the return End-to-End Loopback signal 122 within the predetermined timeout period that is measured using the Timer Logic 1055 (NO in step 1208), then the Connectivity Verification Logic 1054 proceeds to step 1210.

In step 1210, the Connectivity Verification Logic 1054 determines whether there has been a predetermined number N of consecutive failed loopback attempts, where the predetermined number N is a user-configurable number initially set equal to one (1). If there has not been the predetermined number N of consecutive failed loopback attempts (NO in step 1210), then the Connectivity Verification Logic 1054 recycles to step 1204 to transmit another End-to-End Loopback signal 116. However, if there has been the predetermined number N of consecutive failed loopback attempts (YES in step 1210), then the Connectivity Verification Logic 1054 sends the signal to the ATM Call Control Logic 1030 over the interface 1061 indicating that the PVC failed, in step 1212.

After sending the signal to the Data Path Control Logic 1014 indicating that the PVC failed, in step 1212, the Connectivity Verification Logic 1054 continues monitoring the PVC to determine when the PVC is restored. More specifically, the Connectivity Verification Logic 1054 proceeds to transmit the End-to-End Loopback signal 116 to the remote ATM router 108, in step 1214, by forwarding the End-to-End Loopback signal 116 to the ATM Driver 1040 over the interface 1060. The Connectivity Verification Logic 1054 then monitors for the return End-to-End Loopback signal 122, in step 1216. Again, the ATM Driver 1040 receives the return End-to-End Loopback signal 122 transmission, and forwards the return End-to-End Loopback signal 122 to the Connectivity Verification Logic 1054 over the interface 1060. If the Connectivity Verification Logic 1054 does not receive the return End-to-End Loopback signal 122 within a predetermined timeout period that is measured using the Timer Logic 1055 (NO in step 1218), then the Connectivity Verification Logic 1054 recycles to step 1214 to continue monitoring the PVC. However, if the Connectivity Verification Logic 1054 receives the return End-to-End Loopback signal 122 within the predetermined timeout period that is measured using the Timer Logic 1055 (YES in step 1218), then the Connectivity Verification Logic 1054 proceeds to step 1220.

In step 1220, the Connectivity Verification Logic 1054 determines whether there has been a predetermined number M of consecutive successful loopback attempts, where the predetermined number M is a user-configurable number initially set equal to two (2). If there ax has not been the predetermined number M of consecutive successful loopback attempts (NO in step 1220), then the Connectivity Verification Logic 1054 recycles to step 1214 to continue monitoring the PVC. However, if there has been the predetermined number M of consecutive successful loopback attempts (YES in step 1220), then the Connectivity Verification Logic 1054 sends the signal to the ATM Call Control Logic 1030 over the interface 1061 indicating that the PVC is restored, in step 1222. A single iteration of the Connectivity Verification Logic 1054 terminates in step 1299, although a preferred embodiment typically continues monitoring the status of the PVC 110 by re-starting or recycling to step 1202.

Figure 13:
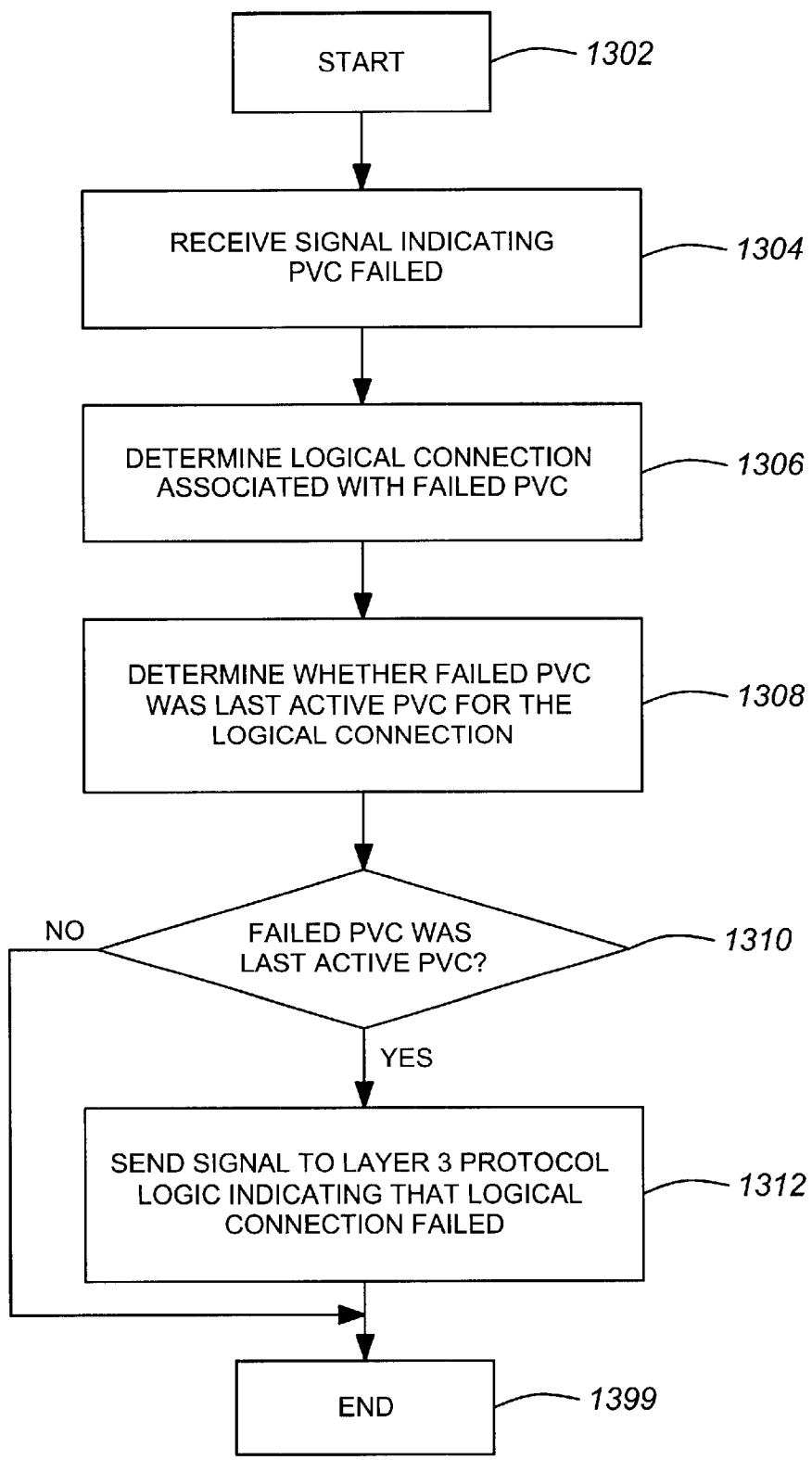
FIG. 13 is a logic flow diagram showing the logic steps performed by the Data Path Control Logic when a PVC fails.

FIG. 13 is a logic flow diagram showing the logic steps performed by the Data Path Control Logic 1014 when a PVC failure is detected. The logic begins in step 1302, and upon receiving the signal indicating that the PVC failed over the interface 1016, in step 1304, proceeds to determine the logical connection that is associated with the failed PVC, in step 1306. The logic then determines whether the failed PVC was the last active PVC for the logical connection, in step 1308. If the failed PVC was the last active PVC for the logical connection (YES in step 1310), then the logic sends the signal to the Network Layer Logic 1006 over the interface 1018 indicating that the logical connection failed. However, if the failed PVC was not the last active PVC for the logical connection (NO in step 1310), then no signal is sent to the Network Layer Logic 1006. The logic terminates in step 1399.

Figure 14:
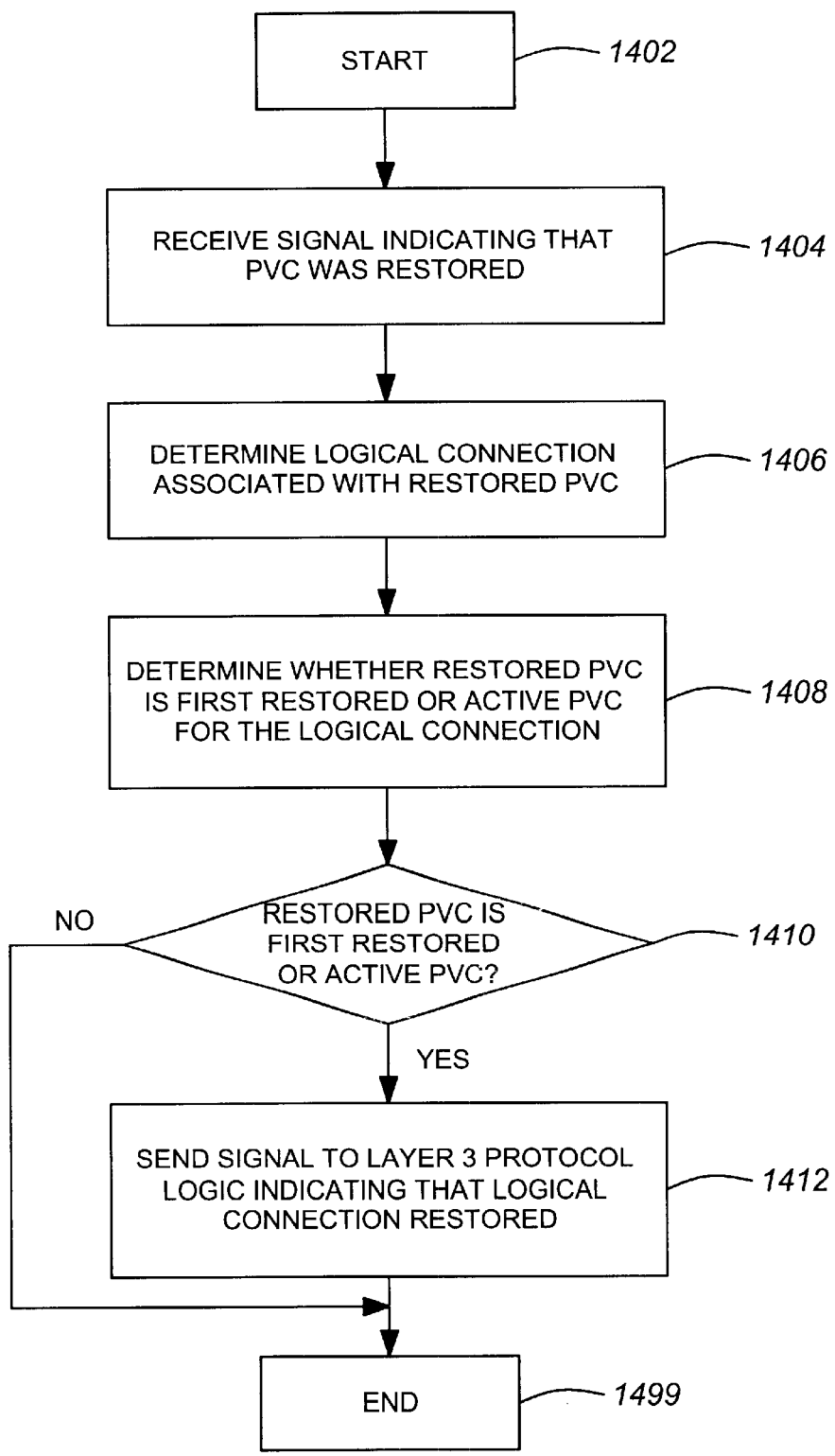
FIG. 14 is a logic flow diagram showing the logic steps performed by the Data Path Control Logic when a PVC is restored.

FIG. 14 is a logic flow diagram showing the logic steps performed by the Data Path Control Logic 1014 when a PVC is restored. The logic begins in step 1402, and upon receiving the signal indicating that the PVC is restored over the interface 1016, in step 1404, proceeds to determine the logical connection that is associated with the restored PVC, in step 1406. The logic then determines whether the restored PVC is the first restored or active PVC for the logical connection, in step 1408. If the restored PVC is the first restored or active PVC for the logical connection (YES in step 1410), then the logic sends the signal to the Network Layer Logic 1006 over the interface 1018 indicating that the logical connection is restored. However, if the restored PVC is not the first restored or active PVC for the logical connection (NO in step 1410), then no signal is sent to the Network Layer Logic 1006. The logic terminates in step 1499.

In a preferred embodiment of the present invention, the ATM Layer Logic 1008 includes logic for detecting a failure of the PVC 110 as well as logic for determining when communication over the PVC 110 has been restored. As discussed above, reacting quickly when the PVC fails is absolutely critical in order to avoid data loss and dropped sessions. Reacting quickly when the PVC is restored is also desirable in order to alleviate any network delays or congestion resulting from the use of a less optimal alternate PVC, although it is not absolutely critical in order to avoid data loss and dropped sessions. Therefore, it will be apparent to a skilled artisan that an alternate embodiment of the present invention may realize many of the advantages of the present invention by including only the logic for detecting the PVC failure and omitting the logic for determining when the PVC is restored.

In a preferred embodiment of the present invention, the ATM Layer Logic 1008 includes both the Alarm Surveillance Logic 1052 and the Connectivity Verification Logic 1054, with the associated Mode Selecting Logic 1053. However, it will be apparent to a skilled artisan that an alternate embodiment may include only the Alarm Surveillance Logic 1052 or only the Connectivity Verification Logic 1054, or may include alternate means for determining the status of the PVC including, but not limited to, physical layer means and alternate ATM protocol layer means.

In a preferred embodiment of the present invention, the logical connection can have multiple PVCs associated with it, and therefore the Data Path Control Logic 1014 is required in order to maintain the status of the logical connection. However, it will be apparent to a skilled artisan that the Data Path Control Logic 1014 is not required if the logical connection is limited to a single PVC. In such an alternate embodiment, the PVC status signals generated by the ATM Call Control Logic 1030, which are sent to the Data Path Control Logic 1014 over the interface 1016 in a preferred embodiment of the present invention, can be sent directly to the Network Layer Logic 1006 over the interface 1018.

In the preferred embodiments of the present invention described herein, the routers are interconnected using ATM Permanent Virtual Circuits (PVCs). However, it will be apparent to a skilled artisan that the techniques of the present invention can be extended to support ATM Switched Virtual Circuits (SVCs). Specifically, the logical connection can include one or more SVCs (alone or together with one or more PVCs). As for the PVCs, the ATM protocol layer monitors the status of each SVC. Typically, the ATM protocol layer is explicitly notified when an SVC is established or terminated, and the ATM protocol layer typically monitors the status of an active SVC, for example, using the connectivity verification mechanism, to detect an SVC failure. The ATM protocol layer generates the appropriate signals based on the SVC status, as described herein.

In a preferred embodiment of the present invention, the network layer protocol is the Internet Protocol (IP), and the routing protocol is the OSPF protocol. However, the present invention is in no way limited to IP and OSPF. The network layer protocol can be any of a number of protocols, including, but not limited to, IP, IPX, Appletalk, and XNS. The routing protocol can be any of a number of protocols, including, but not limited to, OSPF, RIP, BGP, IPX-RIP, and XNS-RIP.

In a preferred embodiment of the present invention, substantially all of the logic described herein, and in particular substantially all of the Data Path Control Logic 1014 and ATM Layer Logic 1008, including substantially all of the Alarm Surveillance Logic 1052 and the Connectivity Verification Logic 1054, is implemented as a set of computer program instructions that are stored in a computer readable medium and executed by an embedded microprocessor system within the local ATM router 102. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Of course, the present invention is in no way limited to use in an ATM network, and specifically to triggering routing table updates based on the status of ATM virtual circuits determined using the alarm surveillance mechanism or the connectivity verification mechanism. Rather, the present invention can be used for reconvergence in various communication networks at various layers of the protocol stack and using various mechanisms for monitoring the status of the logical channels.

Thus, the present invention applies generally to controlling routing table updates in a router. The router includes first protocol layer logic supporting a logical channel at a first protocol layer of a protocol stack, and further includes second protocol layer logic at a second protocol layer of the protocol stack. The first protocol layer logic determines a status of the logical channel (and a status of an associated logical connection) using a mechanism at the first protocol layer of the protocol stack. The routing table is then updated at the second protocol layer of the protocol stack based upon the status of the logical channel or logical connection determined at the first protocol layer of the protocol stack. Preferably, the first protocol layer logic triggers the routing table update at the second protocol layer of the protocol stack, typically by sending a signal to the second protocol layer logic indicating the status of the logical channel (or logical connection). However, the second protocol layer logic may instead monitor, or otherwise poll for, the status of the logical channel (or logical connection) at the first protocol layer of the protocol stack, and trigger the routing table update based upon the status of the logical channel (or logical connection). Other triggering mechanisms are possible.

The present invention is not limited by the type of logical channels supported by the router. The logical channel can be a physical communication channel or a virtual communication channel. Specifically, a logical channel can be a physical layer channel or subchannel (for example, a subchannel derived through time-division multiplexing, frequency-division multiplexing, code-division multiplexing, wavelength-division multiplexing, or other physical layer multiplexing scheme) or a virtual channel at another protocol layer (for example, a virtual channel derived through packet switching, frame relay switching, cell switching, or other multiplexing scheme, typically at the data link layer).

Furthermore, the present invention is not limited by the mechanism used for monitoring the status of the logical channel at the first protocol layer of the protocol stack. The router may determine the logical channel status based alarm signals received from the network (as in the alarm surveillance mechanism). The router may determine the logical channel status based on an end-to-end loopback signal generated by the router and looped back by another network device such as the remote router (as in the connectivity verification mechanism). The router may determine the logical channel status based on connection status information received from another protocol layer in the protocol stack, typically from a protocol layer below the first protocol layer (for example, by determining the status of logical channels at the data link layer based on the physical layer status). The router may determine the logical channel status based on a "keep alive" mechanism, in which the router expects to receive a specific protocol message periodically so long as the logical channel is active. Of course, many other logical channel monitoring schemes are possible and will become apparent to the skilled artisan.

In an alternative embodiment of the present invention, the logical connection comprises a wavelength-division multiplexed subchannel of an optical connection. Logic at the data link layer of the protocol stack monitors the status of the wavelength-division multiplexed subchannel, preferably utilizing a "keep-alive" mechanism in which the routers exchange period "keep-alive" message over the wavelength-division multiplexed subchannel such that the receipt of the periodic "keep-alive" messages indicates that the wavelength-division multiplexed subchannel is active. When the logic detects a failure of the wavelength-division multiplexed subchannel causing the logical connection to fail, the logic sends a signal to the network protocol layer indicating that the logical connection failed. This prompts the network protocol layer to update the routing table to bypass the failed logical connection. When the logic detects that communication over the wavelength-division multiplexed subchannel has been restored such that the logical connection is restored, the logic sends a signal to the network protocol layer indicating that the logical connection is restored. This prompts the network protocol layer to update the routing table to use the restored logical connection.

The present invention may be embodied in other specific forms without departing from the essence or essential characteristics. The described embodiments are to be considered in all respects only as illustrative and not restrictive.

We claim:

1. A method of controlling routing table updates in a routing apparatus, the routing apparatus for operation over a logical connection in a communication network, the routing apparatus including first protocol layer logic at a first protocol layer of a protocol stack and further including second protocol layer logic at a second protocol layer of the protocol stack, the method comprising the steps of:

determining, by the first protocol layer logic, a status of the logical connection using a mechanism at the first protocol layer of the protocol stack, wherein the logical connection comprises at least one logical channel at the first protocol layer of the protocol stack, wherein the first protocol layer is an Asynchronous Transfer Mode (ATM) layer of the protocol stack and wherein the at least one logical channel is an ATM virtual circuit, wherein the first protocol layer logic is ATM protocol layer logic, wherein the step of determining comprises:

determining, by ATM protocol layer logic, the status of the ATM virtual circuit using an ATM mechanism at the ATM protocol layer of the protocol stack, wherein the ATM mechanism is an alarm surveillance mechanism, comprising:

determining that communication over the ATM virtual circuit has been restored following a ATM virtual circuit failure;

determining, by the ATM protocol layer logic, the status of the logical connection based upon the status of the ATM virtual circuit; and triggering, by the ATM protocol layer logic, a routing table update at the second protocol layer of the protocol stack based upon the status of the logical connection; and updating, by the second protocol layer logic, a routing table at the second protocol layer of the protocol stack based upon the status of the logical connection determined by the first protocol layer logic.

2. The method of claim 1 wherein the step of determining that communication over the ATM virtual circuit has been restored following a ATM virtual circuit failure comprises failing to receive by the ATM protocol layer logic an ATM cell indicating that the ATM virtual circuit tailed within a predetermined timeout period.

3. The method of claim 2 wherein the ATM cell is an ATM F5 Operation and Maintenance (OAM) Alarm Indication Signal cell.

4. A method of controlling routing table updates in a routing apparatus, the routing apparatus for operation over a logical connection in a communication network, the routing apparatus including first protocol layer logic at a first protocol layer of a protocol stack and further including second protocol layer logic at a second protocol layer of the protocol stack, the method comprising the steps of:

determining, by the first protocol layer logic, a status of the logical connection using a mechanism at the first protocol layer of the protocol stack, wherein the logical connection comprises at least one logical channel at the first protocol layer of the protocol stack, wherein the first protocol layer is an Asynchronous Transfer Mode (ATM) layer of the protocol stack and wherein the at least one logical channel is an ATM virtual circuit, wherein the first protocol layer logic is ATM protocol layer logic, wherein the step of determining comprises:

determining, by ATM protocol layer logic, the status of the ATM virtual circuit using an ATM mechanism at the ATM protocol layer of the protocol stack, wherein the ATM mechanism is a connectivity verification mechanism, comprising:

determining that communication over the ATM virtual circuit has been restored following a ATM virtual circuit failure, comprising;

transmitting a first ATM cell over the ATM virtual circuit at the ATM protocol layer, wherein to first ATM cell is a first ATM F5 Operation and Maintenance (OAM) End-to-End Loopback cell; and receiving a second ATM cell over the ATM virtual circuit at the ATM protocol layer within a predetermined timeout period, wherein the second ATM cell is a second ATM F5 OAM End-to-End Loopback cell looped back from a remote router;

determining, by the ATM protocol layer logic, the status of the logical connection based upon the status of the ATM virtual circuit;

triggering, by the ATM protocol layer logic, a routing table update at the second protocol layer of the protocol stack based upon the status of the logical connection; and updating, by the second protocol layer logic, a routing table at the second protocol layer of the protocol stack based upon the status of the logical connection determined by the first protocol layer logic.

5. An apparatus for operating over a logical connection in a communication network, the apparatus comprising:

a routing table;

first protocol layer logic at a first protocol layer of a protocol stack, the first protocol layer logic operably coupled to determine the status of the logical connection using a mechanism at the first protocol layer of the protocol stack, wherein the logical connection comprises at least one logical channel at the first protocol layer of the protocol stack, wherein the first protocol layer is an Asynchronous Transfer Mode (ATM) layer of the protocol stack and wherein the at least one logical channel is an ATM virtual circuit, wherein the first protocol layer logic comprises ATM protocol layer logic supporting the ATM virtual circuit at the ATM protocol layer of the protocol stack, the ATM protocol layer logic comprising:

logic for determining the status of the ATM virtual circuit using an ATM mechanism at the ATM protocol layer of the protocol stack, wherein the ATM mechanism is an alarm surveillance mechanism, said logic for determining the status of the ATM virtual circuit comprising:

virtual circuit monitoring logic operably coupled to determine that the ATM virtual circuit has been restored following an ATM virtual circuit failure, said virtual circuit monitoring logic comprising:

monitoring logic operably coupled to receive an ATM cell indicating that the ATM virtual circuit failed; and determining logic operably coupled to determine that the ATM virtual circuit is restored if the ATM cell is not received within a predetermined timeout period;

logic for determining the status of the logical connection based upon the status of the ATM virtual circuit, comprising:

data path control logic responsive to the virtual circuit monitoring logic and operably coupled to determine that the logical connection is restored upon determining that the ATM virtual circuit is restored;

logic for triggering a routing table update at the second protocol layer of the protocol stack based upon the status of the logical connection, comprising:

signal generating logic responsive to the data path control logic and operably coupled to send a signal to the second protocol layer logic indicating that the logical connection is restored; and second protocol layer logic at the second protocol layer of the protocol stack, the second protocol layer logic responsive to the ATM protocol layer logic and operably coupled to update the routing table based upon the status of the logical connection determined by the ATM protocol layer logic.

6. The apparatus of claim 5 wherein the ATM cell is an ATM F5 Operation and Maintenance (OAM) Alarm Indication Signal cell.

7. An apparatus for operating over a logical connection in a communication network, the apparatus comprising:

a routing table;

first protocol layer logic at a first protocol layer of a protocol stack, the first protocol layer logic operably coupled to determine the status of the logical connection using a mechanism at the first protocol layer of the protocol stack, wherein the logical connection comprises at least one logical channel at the first protocol layer of the protocol stack, wherein the first protocol layer is an Asynchronous Transfer Mode (ATM) layer of the protocol stack and wherein the at least one logical channel is an ATM virtual circuit, wherein the first protocol layer logic comprises ATM protocol layer logic supporting the ATM virtual circuit at the ATM protocol layer of the protocol stack the ATM protocol layer logic comprising:

logic for determining the status of the ATM virtual circuit using an ATM mechanism at the ATM protocol layer of the protocol stack, wherein the ATM mechanism is a connectivity verification mechanism, said logic for determining the status of the ATM virtual circuit comprising:

virtual circuit monitoring logic operably coupled to determine that the ATM virtual circuit has been restored following an ATM virtual circuit failure, said virtual circuit monitoring logic comprising:

transmitting logic operably coupled to transmit a first ATM cell over the ATM virtual circuit, wherein the first ATM cell is a first ATM F5 Operation and Maintenance (OAM) End-to-End Loopback cell;

monitoring logic operably coupled to receive a second ATM cell over the ATM virtual circuit, wherein the second ATM cell is a second ATM F5 OAM End-to-End Loopback cell looped back from a remote router; and determining logic operably coupled to determine that the ATM virtual circuit is restored if the second ATM cell is received within a predetermined timeout period;

logic for determining the status of the logical connection based upon the status of the ATM virtual circuit, comprising:

data path control logic responsive to the virtual circuit monitoring logic and operably coupled to determine that the logical connection is restored upon determining that the ATM virtual circuit is restored;

logic for triggering a routing table update at the second protocol layer of the protocol stack based upon the status of the logical connection, comprising:

signal generating logic responsive to the data path control logic and operably coupled to send a signal to the second protocol layer logic indicating that the logical connection is restored; and second protocol layer logic at the second protocol layer of the protocol stack, the second protocol layer logic responsive to the ATM protocol layer logic and operably coupled to update the routing table based upon the status of the logical connection determined by the ATM protocol layer logic.

8. A program product comprising a computer readable medium having embodied therein a computer readable program for updating a routing table in a routing apparatus operating over a logical connection in a communication network, the computer readable program comprising:

first protocol layer program logic programmed to determine the status of the logical connection using a mechanism at a first protocol layer of a protocol stack, wherein the logical connection comprises at least one logical channel at the first protocol layer of the protocol stack, wherein the first protocol layer is an Asynchronous Transfer Mode (ATM) layer of the protocol stack and wherein the at least one logical channel is an ATM virtual circuit wherein the first protocol layer program logic comprises:

computer readable program code means for determining the status of the ATM virtual circuit using an ATM mechanism at the ATM protocol layer of the protocol stack, wherein the ATM mechanism is an alarm surveillance mechanism, comprising:

computer readable program code means for determining that the ATM virtual circuit has been restored following a ATM virtual circuit failure comprising:

computer readable program code means for receiving an ATM cell indicating that the ATM virtual circuit failed;

computer readable program code means for determining that the ATM virtual circuit is restored if the ATM cell is not received within a predetermined timeout period;

computer readable program code means for determining the status of the logical connection based upon the status of the ATM virtual circuit comprising:

computer readable program code means for determining that the logical connection is restored upon determining that the ATM circuit is restored;

computer readable program code means for triggering the routing table update at the second protocol layer of the protocol stack based upon the status of the logical connection, comprising:

computer readable program code means for sending a signal to the second protocol layer program logic indicating that the logical connection is restored; and second protocol layer program logic programmed to update the routing table at the second protocol layer of the protocol stack based upon the status of the logical connection determined by the fist protocol layer program logic.

9. The program product of claim 8 wherein the ATM cell is an ATM F5 Operation and Maintenance (OAM) Alarm Indication Signal cell.

10. A program product comprising a computer readable medium having embodied therein a computer readable program for updating a routing table in a routing apparatus operating over a logical connection in a communication network, the computer readable program comprising:

first protocol layer program logic programed to determine the status of the logical connection using a mechanism at a first protocol layer of a protocol stack, wherein the logical connection comprises at least one logical channel at the first protocol layer of the protocol stack, wherein the first protocol layer is an Asynchronous Transfer Mode (ATM) layer of the protocol stack and wherein the at least one logical channel is an ATM virtual circuit, wherein the first protocol layer program logic comprises:

computer readable program code means for determining the status of the ATM virtual circuit using an ATM mechanism at the ATM protocol layer of the protocol stack, wherein the ATM mechanism is a connectivity verification mechanism, comprising:

computer readable program code means for determining that the ATM virtual circuit has been restored following a ATM virtual circuit failure comprises:

computer readable program code means for transmitting a first ATM cell over the ATM virtual circuit, wherein the first ATM cell is a first ATM F5 Operation and Maintenance (OAM) End-to-End Loopback cell;

computer readable program code means for receiving a second ATM cell over the ATM virtual circuit, wherein the second ATM cell is a second ATM F5 OAM End-to-End Loopback cell looped back from a remote router;

computer readable program code means for determining that the ATM virtual circuit is restored if the second ATM cell is received within a predetermined timeout period;

computer readable program code means for determining the status of the logical connection based upon the status of the ATM virtual circuit, comprising:

computer readable program code means for determining that the logical connection is restored upon determining that the ATM virtual circuit is restored;

computer readable program code means for triggering the routing table update at the second protocol layer of the protocol stack based upon the status of the logical connection, comprising:

computer readable program code means for sending a signal to the second protocol layer program logic indicating that the logical connection is restored; and second protocol layer program logic programmed to update the routing table at the second protocol layer of the protocol stack based upon the status of the logical connection determined by the first protocol layer program logic.

11. A method for updating routing information in a communication network having a first routing device in communication with at least a second routing device over a logical connection, the method comprising the steps of:

determining, by first protocol layer logic of the first routing device, a status of the logical connection using a mechanism at a first protocol layer of a protocol stack, wherein the mechanism is an ATM alarm surveillance mechanism, wherein the first protocol layer is an Asynchronous Transfer Mode (ATM) layer and wherein the logical channel is an ATM virtual circuit, wherein the communication network comprises a switching device interposed between the first routing device and the second routing device and wherein the step of determining comprises the steps of:

detecting an ATM virtual circuit failure by the switching device;

transmitting, by the switching device to the first routing device over the ATM virtual circuit, an ATM F5 Operation and Maintenance (OAM) Alarm Indication Signal cell indicating that the ATM virtual circuit failed;

receiving the ATM F5 OAM Alarm Indication Signal cell by the first routing device at the ATM protocol layer, determining that the logical connection failed upon receiving the ATM F5 OAM Alarm Indication Signal cell; and triggering a routing table update at the second protocol layer of the first routing device to bypass the failed logical connection; and updating, by second protocol layer logic of the first routing device, a routing table at a second protocol layer of the protocol stack based upon the logical connection status determined by the first protocol layer logic.

12. The method of claim 11 wherein the step of determining further comprises the steps of:

periodically retransmitting, by the switching device to the first routing device over the ATM virtual circuit, the ATM F5 OAM Alarm Indication Signal cell while the ATM virtual circuit failure persists;

determining, by the switching device, that communication over the ATM virtual circuit is restored;

discontinuing the periodic ATM F5 OAM Alarm Indication Signal cell retransmissions by the switching device; determining, by the first routing device, that the periodic ATM F5 OAM Alarm Indication Signal cell retransmissions are discontinued;

determining that the logical connection is restored upon determining that the periodic ATM F5 OAM Alarm Indication Signal cell retransmissions are discontinued; and triggering the routing table update at the second protocol layer of the first routing device to use the restored logical connection.

13. A method for updating routing information in a communication network having a first routing device in communication with at least a second routing device over a logical connection, the method comprising the steps of:

determining, by first protocol layer logic of the first routing device, a status of the logical connection using a mechanism at a first protocol layer of a protocol stack wherein the mechanism is an ATM connectivity verification mechanism, wherein the first protocol layer is an Asynchronous Transfer Mode (ATM) layer and wherein the logical channel is an ATM virtual circuit, wherein the communication network comprises a switching device interposed between the first routing device and the second routing device and wherein the step of determining comprises the steps of:

transmitting, by the first routing device to the second routing device over the ATM virtual circuit, a first ATM F5 Operation and Maintenance (OAM) End-to-End Loopback sign cell;

monitoring, by the first routing device, for a second ATM F5 OAM End-to-End Loopback signal cell transmitted by the second routing deice;

determining that the second ATM F5 OAM End-to-End Loopback signal cell failed to be received within a first predetermined timeout period;

determining that the logical connection failed upon determining that the second ATM F5 OAM End-to-End Loopback signal cell failed to be received within the first predetermined timeout period; and triggering a routing table update at the second protocol layer of the first routing device to bypass the failed logical connection; and updating, by second protocol layer logic of first routing device, a routing table at a second protocol layer of the protocol stack based upon the logical connection status determined by the first protocol layer logic.

14. The method of claim 13 wherein the step of determining further comprises the steps of:

transmitting, by the first routing device to the second routing device over the ATM virtual circuit, a third ATM F5 Operation and Maintenance (OAM) End-to-End Loopback signal cell;

monitoring, by the first routing device, for a fourth ATM F5 OAM End-to-End Loopback signal cell transmitted by the second routing device;

determining that the fourth ATM F5 OAM End-to-End Loopback signal cell was received within a second predetermined timeout period;

determining that the logical connection is restored upon determining that the fourth ATM F5 OAM End-to-End Loopback signal cell was received within the second predetermined timeout period; and triggering the routing table update at the second protocol layer of the first routing device to use the restored logical connection.

* * * * *